United States Patent [19]

Neunhoeffer et al.

[11] 4,425,236

[45] Jan. 10, 1984

[54] NOVEL PROCESS FOR REMOVAL OF CADMIUM IONS

[75] Inventors: Otto Neunhoeffer, Homburg; Gerhard Wilhelm, Ladenburg; Lothar Hockenberger, Ludwigshafen; Franz J. Bergmann, Laudenbach; Peter Endruscheit, Weinheim, all of Fed. Rep. of Germany

[73] Assignee: Rutgerswerke Aktiengesellschaft, Fed. Rep. of Germany

[21] Appl. No.: 446,863

[22] Filed: Dec. 6, 1982

Related U.S. Application Data

[63] Continuation of Ser. No. 323,041, Nov. 19, 1981, abandoned.

[30] Foreign Application Priority Data

Nov. 27, 1980 [DE] Fed. Rep. of Germany ....... 3044593

[51] Int. Cl.$^3$ .................... B01D 11/04; C01G 11/00
[52] U.S. Cl. .................................. 210/638; 210/634; 210/732; 423/100; 75/101 BE
[58] Field of Search ................... 423/100; 75/101 BE; 210/633, 634, 638, 729, 732

[56] References Cited

U.S. PATENT DOCUMENTS

| 3,769,205 | 10/1973 | Williams | 423/100 |
| 4,108,958 | 8/1978 | Kok | 423/100 |
| 4,151,077 | 4/1979 | Nogueira | 210/638 |

FOREIGN PATENT DOCUMENTS

| 1028469 | 5/1966 | United Kingdom | 423/100 |
| 1163601 | 9/1969 | United Kingdom | 423/100 |

OTHER PUBLICATIONS

Chemical Abstracts, vol. 88, No. 157980j, 1978.
Chemical Astracts, vol. 87, No. 160622l, 1977.
Separation of Cadmium from Uranium, Cobalt, Nickel, Manganese, Zinc, Copper, Titanium and other Elements by Cation Exchange Chromatography Analytical Chemistry, vol. 32, No. 3, Mar. 1960, 363–365.
Solvent Extraction Studies on Cadmium, Alian, J. Radio and Chem. 29, (1976), pp. 23–37.
Proceedings International Solvent Extraction Conference 1971, vol. II, Society of Chemical Industry, 1971, 1112–1119.
Chemical Abstracts, vol. 83, No. 65211c, 1975.
Chemical Abstracts, vol. 90, No. 192016n, 1979.
Chemical Abstracts, vol. 89, No. 220411n, 1978.
Chemical Abstracts, vol. 89, No. 135137h, 1978.

*Primary Examiner*—Ernest G. Therkorn
*Attorney, Agent, or Firm*—Hammond & Littell, Weissenberger and Muserlian

[57] ABSTRACT

A novel process for the selective removal of cadmium ions from aqueous media such as sewage by contacting the aqueous media with an effective amount of at least one water-insoluble organic polysulfide compound to selectively remove the cadmium ions and separating the polysulfide compounds.

10 Claims, No Drawings

NOVEL PROCESS FOR REMOVAL OF CADMIUM IONS

PRIOR APPLICATION

This application is a continuation of U.S. patent application Ser. No. 323,041 filed Now. 19, 1981, now abandoned.

STATE OF THE ART

Cadmium and cadmium compounds are highly toxic substances and possibly also have a carcinogenic effect. Their toxicological significance is all the greater as cadmium accumulates in the liver and kidneys. However, cadmium plays an important role as an anticorrosive agent for iron as an alloying component in various solder-and bearing metals, in batteries, in the production of pigments, as well as in plastics where cadmium soaps are frequently used as stabilizers. This wide use of the metal has the result that special attention must be given to this metal and its salts within the framework of environmental protection, and attempts must be made to keep the environmental load at minimum, that is, to remove the cadmium ions from sewage.

The present methods of cadmium removal are mostly based upon ion precipitation with alkali metal hydroxide or carbonate, that is, by alkalization of the sewage or collector precipitation with strontium phosphate. Apart from the fact that such precipitation-reagents must be added in excess, and in turn contribute to environmental pollution, these methods are rather elaborate and costly. Besides the precipitated cadmium compounds must also be filtered out and joint filtration with the sewage sludge is not possible since the sewage sludge is then contaminated with cadmium and must be dumped in a special garbage dump. The removal of cadmium from sewage by simpler methods, e.g. by means of ion-exchanges or chelate-forming polymers, has been unsuccesful because the amount of cadmium in the sewage is relatively small compared to the other metal-ions and can not be separated selectively by ion-exchangers, and the capacity of these heavy metal absorbers is too small.

OBJECTS OF THE INVENTION

It is an object of the invention to provide an improved, economical process for the selective removal of cadmium ions form aqueous solutions with an agent having a high absorption capacity for cadmium ions.

It is a further object of the invention to provide an improved economical method for the treatment of sewage to selectively remove cadmium ions from sewage without contaminating the sludge resulting therefrom.

These and other objects and advantages of the invention will become obvious from the following detailed description.

THE INVENTION

The novel process of the invention for the selective removal of cadmium ions from an aqueous media comprises contacting the aqueous media with an effective amount of at least one water-insoluble organic polysulfide compound to selectively remove the cadmium ions and separating the polysulfide compound. The aqueous phase and polysulfide compound are preferably vigorously admixed for optimum contact.

Mercapto compounds are known to form salts with many heavy metal ions to remove the said metals from solution but this activity is not selective for cadmium ions. It has surprisingly been found that water-insoluble organic poly-sulfide compounds will bind cadmium ions with a high selectivity and load capacity, if these compounds are mixed thoroughly with water in which cadmium salts are dissolved alone or together with other metal salts. Other heavy metal ions such as $Hg^{++}$ are also absorbed by the polysulfides but to a far lesser degree than the cadmium ions. Light metal ions such as alkali metal ions and alkaline earth metal ions are substantially uneffected by the organic polysulfide compounds.

Cadmium can be selectively removed from aqueous solutions even at relatively low cadmium ion concentration by intimately admixing the aqueous solution and the water-insoluble organic polysulfide compound for a period of time sufficient to bond the cadmium ions to the sulfur groups and the aqueous phase is then separated from the polysulfide compound by any appropriate means such as gravity settling.

The simplest method with the use of liquid di- or polysulfide compounds consists in swirling them with the aqueous solution, that is, stirring them so vigorously that the organic phase is mixed with the aqueous phase dispersed in fine droplets. The duration of action depends on the ratio of the amount and capacity of the organic sulfur compound to the amount of cadmium ions in the aqueous solution and 10-30 minutes is usually sufficient for the concentrations usually found in sewage. Then, the two phases can be separated and the cadmium-free aqueous solution is isolated.

In addition, other liquid extraction methods can also be used either in con-current or counter-current such as extraction in a loop reactor, parallel flow mixer, disk extractor and in the pulsation column.

The liquid or solid organic polysulfide should be water-insoluble and to avoid the dissolution of even traces of the polysufide compounds, they should have a high molecular weight, i.e. at least 500. Preferred polysulfide compounds are polysulfide oligomers or polymers which can be easily separated from sewage due to their hydrophobic behavior but have a high binding capacity for cadmium ions due to a plurality of di-, tri- and tetrasulfide groups. The binding capacity is up to 10% cadmium by weight.

The polysulfide compounds may be liquid or solid, finely powdered compounds. The absorption capacity of the liquid polysulfides is higher than that of the solid polysulfides and therefore, the solid polysulfides are used in finely powdered form to have as great a surface area as possible for contact with the aqueous media. However, polysulfide polymers which have been hardened by oxidation of mercapto groups of polysulfide oliogomer with heavy metal oxides or other oxygen compounds are not capable of absorbing cadmium ions.

In the following examples there are described several preferred embodiments to illustrate the invention. However, it should be understood that the invention is not intended to be limited to the specific embodiments.

EXAMPLE 1

100 g of a liquid polysulfide polymer were added to a solution of 100 mg of cadmium acetate in one liter of distilled water and the mixture was vigorously stirred for 15 minutes. The stirring was stopped and in the aqueous phase which immediately separated the cadmium ($d^{++}$) *ions could be detected, with dithizone which means that* any cadmium ion concentration in the aqueous phase was less than 0.01 mg $Cd^{++}$/liter.

The liquid polysulfide polymer has an average structure of the formula $$HS-(C_2H_4-O-CH_2-O-C_2H_4-S-S)_{23}-C_2H_4-O-CH_2-O-C_2H_4-SH$$

with about 0.5% cross linkage. The polymer had an average molecular weight of 4000, a viscosity of 35–40 Pas at 27° C. and a density of 1270 kg/m$^3$.

EXAMPLE 2

100 g of a solid, pulverized polysulfide rubber was stirred vigorously into a solution of 100 mg of cadmium acetate in 1000 ml of distilled water at room temperature and the mixture was stirred for 2 hours and was filtered. Only traces of cadmium ions could be detected in the filtrate with dithizone.

The polysulfide was a high molecular weight polysulfide polymer produced by reacting sodium polysulfide and ethane dichloride to obtain an average structure $$HO-(C_2H_4S_4)_n-C_2H_4OH$$

and having a sulfur content of 84% by weight.

EXAMPLE 3

100 g of a liquid polysulfide oligomer and a solution of 5 g of cadmium acetate in one liter of distilled water was vigorously stirred at room temperature for one hour and the cadmium concentration in the aqueous phase was determined to be 3 mg per liter.

The polysulfide oligomer had an average structure as follows:

$$HS-(C_2H_4O-CH_2-O-C_2H_4-S-S)_8-C_2H_4O-CH_2-O-C_2H_4-SH$$

with about 2% cross linkage. The oligomer had an average molecular weight of 1000, a viscosity of 0.7 to 1.2 Pas at 27° C. and a density of 1270 kg/m$^3$.

EXAMPLE 4

100 g of the liquid polysulfide oligomer used in Example 3 and a solution of 10 g of cadmium acetate in one liter of distilled water was vigorously stirred at room temperature for 16 hours after which the polysulfide oligomer settled on the bottom of the reactor as a pasty compound. The cadmium ion concentration in the aqueous phase was determined to be 3 mg/liter.

EXAMPLE 5

100 g of the liquid polysulfide oligomer of Example 3 and one liter of an aqueous solution of 1 g of cadmium acetate, 1 g of potassium chloride, 1 g of calcium chloride and 1 g of ferric chloride with a pH of 4 were vigorously stirred at room temperature for 15 minutes after which the cadmium ion concentration was 5 mg/l. After stirring the mixture for 45 minutes, the cadmium ion concentration was 1 mg/l. No significant removal of the other metal ions was found.

Various modifications of the process of the invention may be made without departing from the spirit or scope thereof and it is to be understood that the invention is intended to be limited only as defined in the appended claims.

What we claim is:

1. A process for the selective removal of cadmium ions from aqueous media comprising contacting the aqueous media with an effective amount of at least one water-insoluble organic polysulfide oligomer or polymer having the average structural formula $$HS-(C_2H_4O-CH_2-O-C_2H_4-S-S)_n-C_2H_4O-CH_2-O-C-C_2H_4-SH$$

wherein n is an integer from 8 to 23 to selectively remove the cadmium ions and separating the polysulfide compound.

2. The process of claim 1 wherein the organic polysulfide compound is a liquid.

3. The process of claim 1 wherein the aqueous media is extracted with a liquid polysulfide in concurrent flow.

4. The process of claim 1 wherein the aqueous media is extracted with a liquid polysulfide in a counter current flow.

5. The process of claim 1 wherein the aqueous media is extracted with a liquid polysulfide in concurrent flow.

6. The process of claim 1 wherein the aqueous media is extracted with a liquid polysulfide in a counter current flow.

7. The process of claim 1 wherein the aqueous media is sewage.

8. The process of claim 1 wherein the polysulfide is solid in finely powdered form.

9. The process of claim 1 wherein n is 23.

10. The process of claim 1 wherein n is 8.

* * * * *